United States Patent Office 3,498,963
Patented Mar. 3, 1970

3,498,963
PROCESS FOR THE CATALYTIC PREPARATION OF 1,2-POLYBUTADIENE HAVING A HIGH PERCENTAGE OF VINYL CONFIGURATION
Mitsuo Ichikawa, Yasumasa Takeuchi, and Akira Kogure, Yokkaichi-shi, and Hisami Kurita, Mie-gun, Mie, Japan, assignors to Japan Synthetic Rubber Co., Ltd., Tokyo, Japan
No Drawing. Filed Sept. 22, 1967, Ser. No. 669,713
Claims priority, application Japan, Sept. 26, 1966, 41/63,159, 41/63,160; July 15, 1967, 42/45,368
Int. Cl. C08f 3/16, 1/44, 3/04
U.S. Cl. 260—94.3      16 Claims

ABSTRACT OF THE DISCLOSURE

Process for preparation of unsaturated hydrocarbon polymer having high percentage vinyl configuration by polymerizing an unsaturated hydrocarbon monomer of 4–10 carbon atoms and having the general formula $CH_2=CH-CR'=CR^2R^3$ in the presence of a catalyst prepared by mixing the following in a hydrocarbon or halogenated hydrocarbon solvent: (A) a cobalt compound, (B) a phosphine represented by the general formula $PR^4R^5R^6$, (C) an organo aluminum compound represented by the general formula $AlR^7R^8R^9$, and (D) water in an amount of 0.25–1.5 mols per mol of said organo aluminum compound.

BACKGROUND OF THE INVENTION

Field of the invention

The present invention relates to a process for the preparation of an unsaturated hydrocarbon polymer and more particularly to a process for the preparation of an unsaturated hydrocarbon polymer having a high percentage of vinyl configuration.

Description of the prior art

For preparing a so-called 1,2-polybutadiene, that is, a butadiene polymer having vinyl configuration in a very high percentage among the three configuration modes of cis-1,4 configuration, trans-1,4 configuration and vinyl configuration, there are known the following various processes:

(1) A process in which an organometallic compound of an alkali metal, such as, ethyl lithium and isoamyl lithium, is used as an initiator ("J. Polymer Sci."; Part C, No. 4, 173 (1963) and "J. Polymer Sci." 61, 155 (1962)). However, ionic catalysts, such as the above, have a reduced catalytic efficiency, as compared with the Ziegler-type catalyst described below. Also, since they tend to be influenced by impurities, particularly water, it is difficult in industrial practice to obtain a high molecular weight polymer and to control the molecular weight by using such a catalyst.

(2) A process in which there is used a so-called Ziegler type catalyst containing, as one component, a transition metal compound. Typical examples of such catalysts are as follows:

(i) $Ti(OR)_4$—$AlR_3$ (wherein R represents an alkyl group) ("Makromol. Chem"; 27, 126 (1964)).

(ii) $V(ACAC)_3$—$AlR_3$ (wherein R represents an alkyl group and ACAC represents an acetylacetonate group) ("Chim. e Ind."; 41, 526 (1959)).

(iii) $Cr(ACAC)_3$—$AlR_3$ ("Chim. e Ind."; 41, 1163 (1959)).

These catalysts are all heterogeneous and the products contain a large proportion of low molecular weight polymers soluble in ether and acetone. The products are syndiotactic or isotactic and are not rubbery. In particular, the 1,2-content in the products obtained by using the V-series catalyst and Cr-series catalyst is less than 90% or usually about 80%.

Besides the aforesaid catalysts, there are also known the catalysts of $Co_2(CO)_8$—$MoCl_5$ ("Kogyo Kagaku Zasshi"; 67, 1652 (1964)) and $MoCl_5$—$ZnR_2$ (U.S.P. 3,232,920), but they are all heterogeneous and a large quantity of catalyst is required to obtain a significantly high catalytic activity. Also, in order to prepare a catalyst having a high catalytic activity, the catalyst must be aged under specific conditions.

As a catalyst for vinyl polymerization of conjugated diolefins other than butadiene, it is known that the aforesaid catalyst, $Ti(OR)_4$—$AlR_3$ can polymerize isoprene to a 3,4-polymer. However, by use of this catalyst, 1,3-pentadiene is not polymerized to a 1,2-polymer but polymerized to a 1,4-polymer ("Makromol. Chem."; 72, 126 (1964)). Furthermore, by use of $Co(ACAC)_3$—$Al(C_2H_5)_2Cl$, 1,3-pentadiene is polymerized to provide a polymer having a 1,2-syndiotactic structure ("European Polymer J." 1, 81 (1965)), but butadiene is polymerized to a cis-1,4 polymer.

In addition, Dr. E. Susa reported in "J. Polymer Sci."; part C, No. 4, 399 (1963) that a cobalt compound-trialkyl aluminum catalyst provided syndiotactic 1,2-polybutadiene but this report is clearly in error ("Ind. and Eng. Chem."; Product Research and Development, vol. 1, No. 1, page 32, March 1962), which was also confirmed by the inventors.

An object of the present invention is to provide an improved process for preparing an unsaturated hydrocarbon polymer having a high percentage of vinyl configuration.

SUMMARY OF THE INVENTION

According to the process of this invention, an unsaturated hydrocarbon polymer having a high percentage of vinyl configuration is prepared by contacting an unsaturated hydrocarbon monomer having 4–10 carbon atoms and represented by the general formula:

$$CH_2=CH-CR^1=CR^2R^3$$

wherein $R^1$ is a hydrogen atom or a methyl group and $R^2$ and $R^3$ represent, respectively, a hydrogen atom, an alkyl group having 1–6 carbon atoms or an alkenyl group having 1–6 carbon atoms, with a catalyst prepared by mixing:

(A) a cobalt compound,
(B) a phosphine represented by the general formula:

$$PR^4R^5R^6$$

wherein $R^4$, $R^5$ and $R^6$ represent, respectively an alkyl group, an aryl group or a hydrogen atom,
(C) an organo aluminum compound represented by the general formula:

$$AlR^7R^8R^9$$

wherein $R^7$, $R^8$, and $R^9$ represent, respectively an alkyl group or an aryl group, and
(D) water in an amount of 0.25–1.5 mols per one mol of said organo aluminum compound, in a hydrocarbon solvent or a halogenated hydrocarbon solvent.

By the process of this invention, a polymer having a high percentage of the vinyl configuration shown by the following general formula

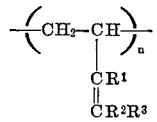

wherein $R^1$, $R^2$, and $R^3$ are as defined above can be obtained. In particular, by the process of this invention, a polymer having a vinyl configuration of more than 90% can be obtained from butadiene, 1,3-pentadiene or 4-methylpentadiene-1,3.

DETAILED DESCRIPTION OF THE INVENTION

In the process of this invention, any polymers from rubbery polymers to resinous polymers may be obtained, as desired, by changing only the kind of phosphine. For example, a polybutadiene obtained by using triphenyl phosphine is a crystalline syndiotactic polymer, while polybutadienes obtained by using ethyldiphenyl phosphine, diethylphenyl phosphine, and triethyl phosphine respectively, are all rubbery polymers and, in particular, a polybutadiene obtained by using triethyl phosphine is a completely amorphous rubbery polymer.

The catalyst systems used in this invention are completely soluble in solvents and no particular aging treatment is necessary in the preparation of the catalyst.

Furthermore, the polymerization rate in the process of this invention is larger than that in conventional methods. For example, in the case of using triphenyl phosphine as the phosphine, a conversion of about 80% can be obtained in several times ten minutes.

Moreover, the process of this invention is not accompanied with the inevitable contamination of the polymer by low molecular weight polymers soluble in ether, acetone and the like.

Examples of the aforesaid unsaturated hydrocarbon monomers to be used in this invention include butadiene, isoprene, 1,3-pentadiene, hexadiene-1,3, heptadiene-1,3, octadiene-1,3, n-octatriene-1,3,6, n-octatriene-1,3,7, 4-methylpentadiene-1,3, 3-methylpentadiene-1,3, 3-methylhexadiene-1,3, 4-methylhexadiene-1,3, 3,7-dimethyloctadiene-1,3, 5-methyl-1,3, 6-heptatriene and the like.

The cobalt compound used as component (A) of the catalyst of this invention may be any cobalt compound of an apparent valence of from zero to the highest. More practically, there are inorganic acid salts of cobalt, organic acid salts of cobalt and complex compounds of cobalt. The preferable examples of the cobalt compounds used in this invention are inorganic acid salts such as cobalt chloride, cobalt bromide, cobalt iodide, cobalt sulfate, cobalt sulfide, cobalt nitrate, cobalt carbonate, cobalt phosphate, cobalt cyanate, cobalt thiocyanate, and cobalt hydroxide; organic acid salts such as cobalt acetate, cobalt oxalate, cobalt valerate, cobalt octenoate, cobalt naphthenate, and cobalt stearate; and complex compounds of cobalt such as cobalt bisacetylacetonate, cobalt bisacetoacetate, cobalt bisdiethylmalonate, cobalt bisdimethylglyoxim, dicyclopentadienylcobalt, bis-1,5-cyclooctadiene cobalt, cyclopentadienylcobalt cyclooctatetraene, cobalt trisacetylacetonate, cobalt triascetoacetnate, cyclopentadienylcobalt dicarbonyl, tri-π-allyl cobalt, cyclohexadiene cobalt dicarbonyl, dicobalt octacarbonyl, dibutadienecobalt tetracarbonyl, butadienecobalt hexacarbonyl and the like.

The phosphine used as component (B) of the catalyst in this invention is shown, as mentioned above, by the general formula $PR^4R^5R^6$ (wherein $R^4$, $R^5$ and $R^6$ represent, respectively, an alkyl group, an aryl group or a hydrogen atom). The preferable alkyl group in the formula is a straight chain-, branched chain-, or cyclic-alkyl group having 1–8 carbon atoms, such as methyl, ethyl, propyl, isopropyl, butyl, isobutyl, hexyl, octyl, and cyclohexyl groups. As the aryl group, phenyl and tolyl groups are preferable. The preferable examples of the phosphine include trimethyl phosphine, triethyl phosphine, tripropyl phosphine, tributyl phosphine, triphenyl phosphine trioctyl phosphine, tricyclohexyl phosphine, monomethyl phosphine, dimethyl phosphine, diethylphenyl posphine, dibutylphenyl phosphine, ethyldiphenyl phosphine, butyldiphenyl phosphine, diethyl phosphine, ethyl posphine, diphenyl phosphine, monophenyl phosphine, cyclotetramethylene-phenyl phosphine, and the like.

The organoaluminum compound used as component (C) of the catalyst in this invention is shown, as mentioned above, by the general formula $AlR^7R^8R^9$ (wherein $R^7$, $R^8$ and $R^9$ represent, respectively, alkyl group or aryl group). The preferable alkyl group is a straight chain or branched chain alkyl group having 1–8 carbon atoms, such as methyl, ethyl, propyl, isopropyl, butyl, isobutyl, hexyl, and octyl groups and also the preferable aryl group is phenyl group although other aryl groups may be used. The preferable examples of the organoaluminum compound used in this invention include trimethyl aluminum, triethyl aluminum, tripropyl aluminum, triisobutyl aluminum, trihexyl aluminum, trioctyl aluminum and triphenyl aluminum.

The catalyst in this invention can be prepared by mixing aforesaid catalyst compounds (A), (B), (C) and (D), but since in the case of using cobalt halides, cobalt cyanate or cobalt thiocyanate, the cobalt compound forms with the phosphine a complex compound shown by the general formula $CoX_2(PR^4R^5R^6)_2$ (where X represents a halogen atom, —CN, or —SCN and $R^4$, $R^5$ and $R^6$ are as defined above), the cobalt-phosphine complex compound, which has previously been prepared, may be used instead of mixing the cobalt compound and the phosphine separately. The use of such a complex compound is particularly preferable since the amount of it may be less than the case of adding the two ingredients separately due to the complex compound being soluble in the solvent. Also, the polymer formed has a higher percentage of vinyl configuration.

Preferable examples of such a cobalt phosphine complex compound include bistriethyl phosphine cobalt chloride, bistriethyl phosphine cobalt bromide, bistriethyl phosphine cobalt iodide, bistriethyl phosphine cobalt thiocyanate, bistriphenyl phosphine cobalt chloride, bistriphenyl phosphine cobalt bromide, bistriphenyl phosphine cobalt iodide, bistriphenyl phosphine cobalt cyanate, bistributyl phosphine cobalt chloride, bistrioctyl phosphine cobalt bromide, bisdiethylphenyl phosphine cobalt bromide, bisethyldiphenyl phosphine cobalt bromide, bisdiphenyl phosphine cobalt chloride, bismonophenyl phosphine cobalt chloride, bistricyclohexyl phosphine cobalt iodide, bistriphenyl phosphine cobalt thiocyanate, bistributyl phosphine cobalt thiocyanate, and the like. The complex compounds of cobalt halides with phosphines are particularly preferable.

The catalyst of the present invention may be prepared by mixing the aforesaid catalyst components in a desired order in, preferably, a hydrocarbon solvent or a halogenated hydrocarbon solvent. The catalyst may be prepared by mixing the components before being contacted with the unsaturated hydrocarbon monomer to be polymerized or may be prepared by mixing the compounds in a reaction vessel in the presence of a part or whole of the unsaturated hydrocarbon monomer to be polymerized. There is no particular limit to the temperature for preparing the catalyst, but usually a range of 0° C. to 50° is preferred.

The mixing ratios of the catalyst components may be selected arbitrarily according to the kinds of the components, the polymerization conditions and the properties of the polymer to be prepared but the molar ratio of Co/Al is usually from about 1/1 to about 1/2000, preferably from about 1/50 to about 1/1000. In case where the insoluble cobalt compound is employed, it is preferable to use about equi-mol of the compound to the aluminum compound.

The proportion of the phosphine is, in the case of using the phosphine as a previously prepared cobalt-phosphine complex compound, 2 mols per one mol of the cobalt compound, but in general the proportion of the phosphine is from about 0.5 to about 100 mols, preferably from about 1.0 mol to about 50 mols per one mol of the cobalt compound.

The proportion of water, which is component (D) of the catalyst, is related to the proportion of the organoaluminum compound. That is, if the amount of water is less than about 0.25 mol or higher than 1.5 mols per one mol of the organo aluminum compound, the polymerization activity of the catalyst is completely lost or extremely reduced. Thus, preferable amount of water is from about 0.5 mol to about 1.0 mol per one mol of the organo aluminum compound. In addition, the amount of water in this case refers to the total amount of water present in the polymerization system.

The polymerization reaction of this invention may be conducted continuously or in a batch system by contacting the unsaturated hydrocarbon monomer with the aforesaid catalyst in a hydrocarbon solvent or a halogenated hydrocarbon solvent.

The amount of the catalyst used in the polymerization reaction is usually about 0.001–1 millimol, preferably 0.01–0.5 millimol based on the amount of the cobalt compound per one mol of the monomer.

The polymerization temperature is usually about −20° C. to about 100° C., preferably about 0° C. to about 80° C. There is no limitation to the pressure for the polymerization, but it must be sufficient to maintain the reaction mixture in substantially a liquid phase.

As the hydrocarbon solvent or halogenated hydrocarbon solvent used in the polymerization reaction or for the preparation of the catalyst, there may be used an aliphatic hydrocarbon, such as, n-pentane, n-hexane, n-heptane, iso-octane and the like; an alicyclic hydrocarbon, such as cyclohexane, Decalin, tetrahydronaphthalene and the like; an aromatic hydrocarbon, such as, benzene, toluene, xylene, cumene and the like; and a halogenated hydrocarbon, such as, methylene chloride, chloroform, carbon tetrachloride, trichlorethylene, perchloroethylene, chlorobenzene, bromobenzene, chlorotoluene and the like. However, considering the polymerization activity, the use of the halogenated hydrocarbon solvent is generally preferable.

Furthermore, it is preferable to conduct the polymerization reaction and the preparation of the catalyst in an inert gas atmosphere, such as, notrogen and argon.

When the polymerization reaction has proceeded to a predetermined stage, the reaction is stopped by adding a polymerization terminating agent. As the polymerization terminating agent there may be used water, an alcohol, or an organic acid, but it is desirable to use a compound usually used as an antioxidant, such as, phenyl-$\beta$-naphthylamine and 2,6-di-tert.-butyl-p-cresol. If the reaction mixture is contacted with air before the addition of the antioxidant, the polymer product tends to gelate to form an insoluble polymer. After stopping the reaction, the polymer thus formed is separated from the remaining reaction mixture and dried to provide a desired polymer by conventional means.

The polymer obtained by the process of this invention has usually more than 60% vinyl configuration and by selecting the suitable polymerization conditions, polymers having more than 99% vinyl configuration can be obtained. Further, by selecting the polymerization conditions, particularly, the kind of the phosphine, the polymer obtained can be changed from crystalline to amorphous. Thus, the high molecular weight amorphous polymer obtained by the process of this invention shows a rubber like property while the high molecular weight crystalline polymer shows a resinous property. In general, since the polymer prepared by the process of this invention has good thermal stability and also a large number of carbon-carbon double bonds in the molecule, it can be easily vulcanized and is useful as a base polymer of a graft polymer.

Also, polybutadiene obtained from butadiene by the process of this invention and having a high percentage of vinyl configuration can be blended with natural rubber, styrene-butadiene rubber, cis-1,4-polybutadiene rubber, and is useful as a base polymer of a graft polymer as well as raw materials for preparing high molecular weight plastics materials having good heat resistance.

The practice of the invention will be explained more in detail in the following examples, but it should be understood that the invention shall not be limited by the examples.

In the following examples, the intrinsic viscosity $[\eta]$ was measured as a toluene solution at 30° C., and also the microstructure of the polymers was measured by infrared absorption spectra and by NMR absorption spectra.

EXAMPLE 1

Methylene chloride, butadiene, cobalt bis-acetylacetonate, triphenyl phosphine, triethyl aluminum and water were charged, in this order, in a 100 ml. glass tube at 50° C. under a nitrogen gas atmosphere and the glass tube was sealed. The total volume of the mixture in the glass tube was 50 ml., the molar ratio of Al/Co/P/butadiene in the mixture was 430/1/2/100,000, and the concentration of butadiene in the mixture was 2.0 mol/liter, while the amount of water was varied as shown in Table 1. The polymerization reaction was carried out for 18 hours at 10° C. while stirring.

After the end of the polymerization reaction, the sealed glass tube was opened and the content was poured in methanol containing a small amount of an antioxidant, phenyl-$\beta$-naphthylamine, whereby the reaction was stopped and at the same time the polymer thus formed was coagulated and precipitated. The precipitate was separated from the system and dried under a reduced pressure at a room temperature. By an X-ray diffraction analysis, it was confirmed that the product was polybutadiene showing a crystalline property.

The results are shown in Table 1.

TABLE 1

| Experiment Number | Water/Al(C$_2$H$_5$)$_3$, molar ratio | Polymer yield, g. | Microstructure of Polymer, Percent | | |
|---|---|---|---|---|---|
| | | | Cis-1,4 | Trans-1,4 | Vinyl |
| 1 | 0.01 | 0 | | | |
| 2 | 0.5 | 1.3 | 9.6 | 0.5 | 89.9 |
| 3 | 1.0 | 1.8 | 5.2 | 0.4 | 94.4 |

The product, syndiotactic 1,2-polybutadiene was soluble in benzene and toluene and contained almost no gels. The product was however insoluble in isooctane and acetone.

EXAMPLE 2

The same procedure as in Example 1 was repeated except that anhydrous cobalt bromide was used instead of cobalt bis-acetylacetonate, polymerization time was varied, and the molar ratio of water/Al(C$_2$H$_5$)$_3$ was 1.0. The results are shown in Table 2.

TABLE 2

| Experiment number | Co-compound | Polymerization time, hours | Yield, g. | Vinyl configuration, percent |
|---|---|---|---|---|
| 4 | Co$_2$(CO)$_8$ | 2 | 1.29 | 91.6 |
| 5 | Co(ACAC)$_3$ | 1 | 1.61 | 94.1 |
| 6 | CoBr$_2$ | 1 | 2.23 | 92.3 |
| 7 | Tris-$\pi$-allyl cobalt | 1 | 2.01 | 90.4 |
| 8 | Cyclopentadienylcobalt dicarbonyl | 2 | 1.97 | 94.8 |

EXAMPLE 3

The same procedure as in experiment 6 of Example 2 was repeated using toluene as a solvent instead of methylene chloride. The results thus obtained are shown in Table 3.

TABLE 3

| Experiment number | Water/ $Al(C_2H_5)_3$ (molar ratio) | Polymerization time, hours | Yield, g. | Microstructure, percent | | |
|---|---|---|---|---|---|---|
| | | | | Cis-1,4 | Trans-1,4 | Vinyl |
| 9 | 0.01 | 13 | 0 | | | |
| 10 | 0.5 | 13 | 0.43 | 10.8 | 0 | 89.2 |
| 11 | 1.0 | 13 | 2.43 | 7.8 | 0 | 92.2 |

EXAMPLE 4

Polymerization of butadiene was conducted by the same procedure as in Example 1 while maintaining the molar ratio of water to $Al(C_2H_5)_3$ to 1.0 and varying the amount of triphenyl phosphine. The results thus obtained are shown in Table 4.

TABLE 4

| Experiment number | A, molar ratio | Polymerization time, hours | Yield, g. | $(\eta)$ | Microstructure, percent | | |
|---|---|---|---|---|---|---|---|
| | | | | | Cis-1,4 | Trans-1,4 | Vinyl |
| 12 [1] | 0 | 2.5 | 3.34 | | 94.1 | 2.1 | 3.8 |
| 13 | 1.0 | 16 | 2.97 | 2.96 | 6.1 | 0.4 | 93.5 |
| 14 | 2.0 | 16 | 1.58 | 2.72 | 0 | 0 | 100 |
| 15 | 3.0 | 16 | 2.74 | 2.85 | 4.2 | 0.9 | 94.9 |
| 16 | 4.0 | 16 | 1.12 | 2.29 | 4.7 | 0 | 95.3 |
| 17 | 5.0 | 16 | 1.46 | 3.07 | 9.6 | 0 | 90.4 |
| 18 | 10.0 | 16 | 1.42 | 2.78 | 5.0 | 0 | 95.0 |

[1] Control.
A: Molar ratio of triphenyl phosphine to cobalt bis-acetylacetonate.

From the above results, it is confirmed that triphenyl phosphine is an inevitable component for preparing high vinyl containing polybutadiene and the content of vinyl configuration is not greatly influenced by the variation in the amount of triphenyl phosphine.

EXAMPLE 5

The same procedure as in Example 4 was repeated except that cobalt octenoate was used instead of cobalt bis-acetylacetonate.

The results are shown in Table 5.

TABLE 5

| Experiment number | B, molar ratio | Polymerization time, hours | Yield, g. | $(\eta)$ | Microstructure, percent | | |
|---|---|---|---|---|---|---|---|
| | | | | | Cis-1,4 | Trans-1,4 | Vinyl |
| 19 [1] | 0 | 18 | 2.66 | | 96.0 | 1.6 | 2.4 |
| 20 | 1.0 | 16 | 2.95 | 3.19 | 6.0 | 0.2 | 93.8 |
| 21 | 2.0 | 16 | 2.25 | 2.83 | 4.6 | 0.3 | 95.1 |
| 22 | 3.0 | 16 | 1.50 | 2.40 | 7.4 | 0 | 92.6 |
| 23 | 4.0 | 16 | 0.85 | 1.45 | 4.5 | 0 | 95.5 |

[1] Control.
B: $PPh_3$/Cobalt octenoate molar ratio.

EXAMPLE 6

In a 100 ml. glass tube were placed methylene chloride, butadiene, cobalt bis-acetylacetonate, the phosphine shown in Table 6, triethyl aluminum and water in this order at 5° C. under a nitrogen gas atmosphere and then the glass tube was sealed. The total volume of the mixture in the tube was 50 ml., the molar ratio of phosphine/Co/Al/butadiene was 2/1/215/1,000,000, the content of cobalt bis-acetylacetonate was 0.000928 millimol, and the molar ratio of water/$Al(C_2H_5)_3$ was 0.5/1.0 or 1.0/1.0. Thereafter, the polymerization reaction was conducted for 16 hours at 40° C. while stirring.

In each experiment, rubber like polybutadiene having a high percentage of vinyl configuration was obtained. Also, by an X-ray diffraction analysis, the polymer was confirmed to be amorphous. The results are shown in Table 6.

The 1,2-polybutadiene thus obtained was soluble in benzene, toluene, and isooctane, but insoluble in acetone.

TABLE 6

| Experiment Number | Phosphine | $H_2O$/ $Al(C_2H_5)_3$, Molar ratio | Yield, g. | $(\eta)$ | Microstructure, percent | | |
|---|---|---|---|---|---|---|---|
| | | | | | cis-1,4 | Trans-1,4 | Vinyl |
| 24 | $(C_2H_5)_3P$ | 0.5 | 0.31 | | 26.2 | 0.7 | 73.1 |
| | | 1.0 | 0.59 | 0.86 | 15.2 | 2.2 | 82.6 |
| 25 | $(C_2H_5)_2P(C_6H_5)$ | 0.5 | 0.05 | 1.22 | 20.5 | 0.5 | 79.0 |
| | | 1.0 | 1.46 | | 16.9 | 2.0 | 81.0 |
| 26 | $(C_2H_5)P(C_6H_5)_2$ | 0.5 | 0.72 | 1.30 | 8.8 | 0.2 | 91.0 |
| | | 1.0 | 1.89 | | 6.7 | 1.0 | 93.1 |
| 27 | $(C_6H_{11})_3P$ | 1.0 | 1.44 | 1.13 | 17.2 | 0.6 | 82.2 |
| 28 | $(n-C_4H_9)_3P$ | 1.0 | 1.88 | 1.07 | 14.8 | 0.7 | 84.5 |
| 29 | $(n-C_3H_7)_3P$ | 1.0 | 1.59 | 1.05 | 19.0 | 0.7 | 80.3 |

EXAMPLE 7

In a 100 ml. glass tube were charged 17 ml. of methylene chloride, 4.64 ml. of 1 mmol/liter methylene chloride solution of bis-triphenyl phosphine cobalt bromide, 40 ml. of a 1.38 mol/liter methylene chloride solution of butadiene, 2.02 ml. of 1 mol/liter methylene chloride solution of triethyl aluminum, and a predetermined amount of water in this order at 5° C. under a nitrogen gas atmosphere, and then the glass tube was sealed. The polymerization reaction was conducted for 20 hours at 10° C. while stirring.

After the end of the polymerization reaction, the content was poured in methanol containing a small amount of antioxidant, phenyl-$\beta$-naphthylamine, whereby the reaction was stopped and at the same time the polymer produced was precipitated. The precipitate was separated and dried under a reduced pressure at room temperature. The results are shown in Table 7.

TABLE 7

| Experiment Number | $H_2O$/ Triethyl Al, molar ratio | Yield, g. | Microstructure, percent | | |
|---|---|---|---|---|---|
| | | | Cis-1,4 | Trans-1,4 | Vinyl |
| 30 [1] | 0.01 | 0 | | | |
| 31 [1] | 0.1 | Trace | | | |
| 32 | 0.3 | 0.20 | 14.7 | 0.3 | 85.1 |
| 33 | 0.5 | 0.53 | 12.4 | 0 | 87.6 |
| 34 | 0.8 | 0.96 | 8.5 | 0 | 91.5 |
| 35 | 1.0 | 1.10 | 6.0 | 0 | 94.0 |
| 36 [1] | 2.0 | 0 | | | |

[1] Control.

EXAMPLE 8

The same procedure as in Example 7 was repeated using triisobutyl aluminum and trihexyl aluminum instead of triethyl aluminum. The results are shown in Table 8.

TABLE 8

| Experiment No. | Aluminum compound | $H_2O$/Al compd., molar ratio | Polymerization time, hr. | Yield, g. | Microstructure, percent | | |
|---|---|---|---|---|---|---|---|
| | | | | | Cis-1,4 | Trans-1,4 | Vinyl |
| 37 | Triisobutyl aluminum | 0.5 | 2 | 1.48 | 4.3 | 0 | 95.7 |
| | | 1.0 | 2 | 1.38 | 7.5 | 0 | 92.5 |
| 38 | Trihexyl aluminum | 0.5 | 20 | 0.23 | 9.2 | 0 | 90.8 |
| | | 1.0 | 20 | 0.47 | 10.6 | 0 | 89.4 |

EXAMPLE 9

Butadiene was polymerized according to the following polymerization recipe.

Polymerization recipe:
- Butadiene _____mols__ 0.1
- Cobalt halide-phosphine complex _____millimols__ 0.005
- Triisobutyl aluminum _____do____ 2
- Methylene chloride _____mils__ 50
- Water/triisobutyl aluminum (molar ratio) __ 1.0
- Polymerization temperature _____° C__ 10
- Polymerization time _____ Varied The results are shown in Table 9.

TABLE 9

| Experiment No. | Cobalt Halide-Phosphine Complex | Polymerization time, hr. | Yield, percent | $(\eta)$ | Vinyl, percent |
|---|---|---|---|---|---|
| 39 | $CoBr_2(Et_3P)_2$ | 180 | 80 | 1.79 | 99 |
| 40 | $CoBr_2(Et_2PhP)_2$ | 180 | 78 | 1.66 | 95 |
| 41 | $CoBr_2(EtPh_2P)_2$ | 180 | 67 | 2.13 | 99 |
| 42 | $CoBr_2(Ph_3P)_2$ | 15 | 42 | 3.12 | 99 |
| 43 | $CoCl_2(Et_3P)_2$ | 180 | 81 | 1.75 | 99 |
| 44 | $CoCl_2(Ph_3P)_2$ | 15 | 28 | 3.49 | 99 |
| 45 | $CoI_2(Et_3P)_2$ | 180 | 61 | 1.49 | 96 |
| 46 | $CoI_2(Ph_3P)_2$ | 60 | 33 | 4.04 | 94 |

Et stands for ethyl group and Ph stands for phenyl group.

EXAMPLE 10

In 100 ml. glass tube was charged 38 ml. of methylene chloride and distilled water was added thereto. Thereafter, there were added 6.8 g. of 1,3-pentadiene, 2.0 millimols of triethyl aluminum and 0.005 millimol of a cobalt compound-phosphine complex compound in this order. The aforesaid procedures were all conducted under a nitrogen gas atmosphere.

After sealing the glass tube, the polymerization reaction was conducted at 10° C., while rotating the glass tube in a polymerization bath for a predetermined period of time. The tube was opened and a small amount of phenyl-$\beta$-naphthylamine was immediately added therein followed by stirring thoroughly, whereby the polymerization was terminated. The reaction mixture was poured into a hydrochloride methanol solution containing the antioxidant to decompose the catalyst and at the same time to precipitate the polymer thus formed. The precipitated polymer was separated, washed with methanol containing the antioxidant several times, and then dried for one night in vacuum at 40° C. The results are shown in Table 10.

TABLE 10

| Experiment No. | A | B | Polymerization time, hr. | Yield, g. | $(\eta)$ | 1,2-configuration, percent | Trans-1,4 configuration, percent |
|---|---|---|---|---|---|---|---|
| 47 [1] | $CoBr_2$ | 1 | 2 | 6.54 | 0.21 | 5 | 95 |
| 48 | $CoBr_2(PPh_3)_2$ | 1 | 2 | 1.96 | 2.59 | 95 | 5 |
| 49 | $CoBr_2(PPh_2Et)_2$ | 1 | 2 | 2.84 | 3.09 | 98 | 2 |
| 50 | $CoBr_2(PPhEt_2)_2$ | 1 | 2 | 1.88 | 2.56 | 99 | 1 |
| 51 | $CoBr_2(PEt_3)_2$ | 1 | 2 | 1.48 | 2.27 | 99 | 1 |
| 52 | $CoBr_2(PEt_3)_2$ | 0 | 50 | 0 | | | |

[1] Control.
A: Cobalt compound-phosphine complex compound.
B: $H_2O/Al(C_2H_5)_3$ (molar ratio).

As is clear from the above table, it is confirmed that in the control experiment 47, wherein phosphine is not used, 1,2-polymer is not obtained but trans-1,4-polymer is obtained instead. Also, it is confirmed that in the control experiment 52 wherein substantially no water was present (about 3 p.p.m.), the catalyst has no activity.

EXAMPLE 11

The same procedures as in experiments 48 and 51 in Example 10 were repeated except that tri-isobutyl aluminum was employed instead of triethyl aluminum and the polymerization was conducted for 5 hours. The results are shown in Table 11.

TABLE 11

| Experiment No. | Co-compd.-Phosphine Complex | Yield, g. | (η) | 1,2-configuration percent |
|---|---|---|---|---|
| 53 | CoBr₂(PPh₃)₂ | 1.74 | 1.43 | 97 |
| 54 | CoBr₂(PEt₃)₂ | 2.69 | 2.94 | 99 |

EXAMPLE 12

The polymerization of methylpentadiene-1,3 was conducted by the same conditions as in experiment 48 of Example 10 except that the polymerization period of time was 5 hours. By the procedure, 1.06 g. of a polymer consisting almost of 1,2-configuration was obtained.

As is clear from the above table, it is confirmed that the amount of water has to be in a range of 0.25–1.50 mols per one mol of the organo aluminum and particularly about equi-mol ratio is preferable.

EXAMPLE 15

In the example, there are shown the results obtained by adding a cobalt compound and phosphine separately instead of using the cobalt compound-phosphine complex.

The polymerization procedure was the same as in Example 10 but the addition order of ingredients into a glass tube was a solvent, water, a monomer, an organo aluminum, phosphine, and a cobalt compound, respectively. The molar ratio of water to organo aluminum compound was 1.0, the reaction temperature was 10° C., and other polymerization conditions are shown in the Table 14 together with the results.

TABLE 14

| Experiment number | Monomer | Cobalt compound | Mmol. | Organo aluminum | Mmol. | Phosphine | Mmol. | Solvent | Ml. | Polymerization time, hr. | Yield | Vinyl config., percent | (η) |
|---|---|---|---|---|---|---|---|---|---|---|---|---|---|
| 67 | Isoprene | Co-Oct.[1] | 0.005 | AlEt₃[3] | 2.0 | PEt₃ | 0.01 | Methylene chloride. | 38 | 24 | 0.24 | 65 | |
| 68 | do | Co-Oct. | 0.005 | AlEt₃ | 2.0 | P(Ph)Et₂[5] | 0.01 | do | 38 | 5 | 1.57 | 61 | 2.09 |
| 69 | do | Co(ACAC)₂[2] | 0.005 | AlEt₃ | 2.0 | PEt₃ | 0.02 | do | 38 | 24 | 0.13 | 64 | |
| 70 | do | Co(ACAC)₂ | 0.005 | AlEt₃ | 2.0 | P(Ph)Et₂ | 0.01 | do | 38 | 5 | 1.22 | 68 | 2.06 |
| 71 | do | Co(ACAC)₂ | 0.002 | AlEt₃ | 2.0 | PEt₃ | 0.004 | Toluene | 38 | 24 | 0.05 | 63 | |
| 72 | Pentadiene | Co(ACAC)₂ | 0.002 | Al(i-Bu)₃[4] | 1.0 | P(Ph)₃ | 0.001 | Methylene chloride. | 19 | 3 | 0.10 | 96 | |
| 73 | do | Co-Oct. | 0.005 | Al(i-Bu)₃ | 1.0 | PEt₃ | 0.01 | do | 19 | 3 | 0.90 | 98 | |
| 74 | do | Co-Oct. | 0.005 | Al(i-Bu)₃ | 1.0 | P(Ph)Et₂ | 0.01 | do | 19 | 3 | 0.86 | 98 | |
| 75 | do | Co-Oct. | 0.005 | Al(i-Bu)₃ | 1.0 | P(Ph)₂Et | 0.01 | do | 19 | 3 | 1.21 | 98 | |
| 76 | do | Co-Oct. | 0.005 | Al(i-Bu)₃ | 1.0 | P(Ph)₃ | 0.01 | do | 19 | 3 | 1.39 | 96 | |
| 77 | do | Co-Oct. | 0.002 | AlEt₃ | 1.0 | P(Ph)₃ | 0.004 | Toluene | 19 | 5 | 0.72 | 97 | |
| 78 | 5-methyl-heptatrien-1,3,6. | Co(ACAC)₂ | 0.002 | Al(i-Bu)₃ | 1.0 | P(Ph)₃ | 0.004 | Methylene chloride. | 29 | 18 | 0.69 | 91 | 1.07 |

[1] Cobalt octenoate.
[2] Cobalt bis-acetyl acetate.
[3] Et stands for ethyl group.
[4] i-Bu stands for isobutyl group.
[5] Ph stands for phenyl group.

EXAMPLE 13

Polymerization recipe:
Isoprene _____ g__ 6.8
Cobalt compound-phosphine
  complex _____ mmols__ 0.005
Triethyl aluminum _____ mmols__ 2.0
Water _____ mmols__ 2.0
Solvent _____ mls__ 38

The polymerization of isoprene was conducted at 10° C., by the same procedure as in Example 10 according to the above polymerization recipe. The results are shown in Table 12.

TABLE 12

| Experiment No. | A | Solvent | Polymerization time, hr. | Yield, g. | (η) | 3,4-configuration, percent | Appearance of polymer |
|---|---|---|---|---|---|---|---|
| 56[1] | CoBr₂ | Methylene chloride | 18 | 5.09 | 0.29 | 13 | Viscous liquid. |
| 57 | CoBr₂(PPh₃)₂ | Toluene | 15 | 0.50 | | 62 | Rubbery. |
| 58 | CoBr₂(PPh₂Et)₂ | Methylene chloride | 15 | 2.21 | 1.60 | 62 | Do. |
| 59 | CoBr₂(PPhEt₂)₂ | do | 2 | 3.18 | 3.94 | 64 | Do. |
| 60 | CoBr₂(PEt₃)₂ | do | 2 | 1.20 | 1.94 | 65 | Do. |

[1] Control.
A: Cobalt compound-puosphine complex.

EXAMPLE 14

Polymerization recipe:
Isoprene _____ g__ 6.8
CoBr₂[P(C₂H₅)₃]₂ _____ mmols__ 0.005
Al(C₂H₅)₃ _____ mmols__ 2.0
Water _____ Varied
Methylene chloride _____ mls__ 38

Isoprene was polymerized by the same procedure as in Example 10 at 10° C. for 3 hours according to the above polymerization recipe. The results are shown in Table 13.

TABLE 13

| Experiment No. | H₂O/Al(C₂H₅)₃, molar ratio | Yield, g. | (η) | 3,4-bond, percent | Appearance of polymer |
|---|---|---|---|---|---|
| 61[1] | 0 | Trace | | | |
| 62 | 0.25 | 0.10 | | | |
| 63 | 0.50 | 0.15 | | 60 | Rubbery. |
| 64 | 0.75 | 0.85 | 1.05 | 61 | Do. |
| 65 | 1.00 | 1.88 | 1.15 | 65 | Do. |
| 66 | 1.50 | 0.14 | | 61 | Do. |

[1] Control.

We claim:
1. A process for the preparation of an unsaturated hydrocarbon polymer having a high percentage of vinyl configuration which comprises contacting an unsaturated hydrocarbon monomer having 4–10 carbon atoms and represented by the general formula

$$CH_2=CH-CR^1=CR^2R^3$$

wherein $R^1$ represents a member selected from the group consisting of hydrogen atom and methyl group and $R^2$ and $R^3$ represent, respectively, a member selected from the group consisting of hydrogen atom, an alkyl group having 1–6 carbon atoms and an alkenyl group having 1–6 carbon atoms, with a catalyst prepared by mixing the following in a solvent selected from the group consisting of hydrocarbon and halogenated hydrocarbon solvents:
(A) a cobalt compound,
(B) a phosphine represented by the general formula $$PR^4R^5R^6$$

wherein $R^4$, $R^5$ and $R^6$ represent, respectively, a member selected from the group consisting of an alkyl group, an aryl group, and hydrogen atom,
(C) an organo aluminum compound represented by the general formula $$AlR^7R^8R^9$$

wherein $R^7$, $R^8$ and $R^9$ represent, respectively, a member selected from the group consisting of an alkyl group and an aryl group, and
(D) water in an amount of 0.25–1.50 mols per one mol of said organo aluminum compound.

2. The process as claimed in claim 1 wherein the unsaturated hydrocarbon monomer is butadiene.

3. The process as claimed in claim 1 wherein the unsaturated hydrocarbon monomer is isoprene.

4. The process as claimed in claim 1 wherein the unsaturated hydrocarbon monomer is 1,3-pentadiene.

5. The process as claimed in claim 1 wherein the unsaturated hydrocarbon monomer is methylpentadiene-1,3.

6. The process as claimed in claim 1 wherein the unsaturated hydrocarbon monomer is 5-methylheptatriene-1,3,6.

7. The process as claimed in claim 1 wherein the molar ratio of the cobalt compound to the organo aluminum compound is from 1:1 to 1:2000 and the molar ratio of the cobalt compound to the phosphine is from 1:0.5 to 1:100.

8. The process as claimed in claim 1 wherein the amount of the catalyst is from 0.001 to 1 millimol based on the amount of the cobalt compound per one mol of the monomer.

9. The process as claimed in claim 1 wherein the temperature of preparing the catalyst is from 0 to 50° C.

10. The process as claimed in claim 1 wherein the unsaturated hydrocarbon monomer is contacted with the catalyst at a temperature of 20 to 100° C.

11. A process for the preparation of an unsaturated hydrocarbon polymer having a high percentage of vinyl configuration which comprises contacting an unsaturated hydrocarbon monomer having 4–10 carbon atoms and represented by the general formula $$CH_2=CH-CR^1=CR^2R^3$$

wherein $R^1$ represents a member selected from the group consisting of hydrogen atom and methyl group and $R^2$ and $R^3$ represent, respectivelvy, a member selected from the group consisting of hydrogen atom, an alkyl group having 1–6 carbon atoms and an alkenyl group having 1–6 carbon atoms, with a catalyst prepared by mixing the following in a halogenated hydrocarbon solvent:
(A) at least one cobalt compound selected from the group consisting of an inorganic acid salt of cobalt, an organic acid salt of cobalt and a complex compound of cobalt,
(B) a phosphine represented by the general formula $$PR^4R^5R^6$$

wherein $R^4$, $R^5$ and $R^6$ represent, respectively, a member selected from the group consisting of an alkyl group, an aryl group, and hydrogen atom,
(C) an organo aluminum compound represented by the general formula $$AlR^7R^8R^9$$

wherein $R^7$, $R^8$ and $R^9$ represent, respectively, a member selected from the group consisting of an alkyl group and an aryl group, and
(D) water in an amount of 0.25–1.50 mols per one mol of said organo aluminum compound.

12. The process as claimed in claim 11 wherein said cobalt compound is selected from the group consisting of cobalt bisacetylacetonate, cobalt bromide, cobalt octenoate, dicobalt octacarbonyl, cobalt trisacetylacetonate, tris-$\pi$-allyl-cobalt and cyclopentadienylcobalt dicarbonyl.

13. The process as claimed in claim 11 wherein said phosphine is selected from the group consisting of triphenyl phosphine, triethyl phosphine, diethylphenyl phosphine, ethyldiphenyl phosphine, tricyclohexyl phosphine, tri-n-butyl phosphine and tri-n-propyl phosphine.

14. The process as claimed in claim 11 wherein said organo aluminum compound is selected from the group consisting of triethyl aluminum, triisobutyl aluminum and trihexyl aluminum.

15. A process for the preparation of an unsaturated hydrocarbon polymer having a high percentage of vinyl configuration which comprises contacting an unsaturated hydrocarbon monomer having 4–10 carbon atoms and represented by the general formula $$CH_2=CH-CR^1=CR^2R^3$$

wherein $R^1$ represents a member selected from the group consisting of hydrogen atom and methyl group and $R^2$ and $R^3$ represent, respectively, a member selected from the group consisting of an alkyl group having 1–6 carbon atoms and an alkenyl group having 1–6 carbon atoms, with a catalyst prepared by mixing the following in a solvent selected from the group consisting of hydrocarbon and halogenated hydrocarbon solvents:
(A) a complex compound represented by the general formula $$CoX_2(PR^4R^5R^6)_2$$

wherein X represents a halogen atom and $R^4$, $R^5$ and $R^6$ represent, respectively a member selected from the group consisting of an alkyl group, an aryl group and hydrogen atom,
(B) an organo aluminum compound represented by the general formula $$AlR^7R^8R^9$$

wherein $R^7$, $R^8$ and $R^9$ represent, respectively, a member selected from the group consisting of an alkyl group and an aryl group, and
(C) water in an amount of 0.25–1.50 mols per one mol of said organo aluminum compound.

16. The process as claimed in claim 15 wherein said complex compound is selected from the group consisting of bistriphenyl phosphine cobalt bromide, bistriethyl phosphine cobalt bromide, bisdiethyl phenyl phosphine cobalt bromide, bisethyldiphenyl phosphine cobalt bromide, bistriphenyl phosphine cobalt chloride, bistriethyl phosphine cobalt chloride, bistriphenyl phosphine cobalt iodide and bistriethyl phosphine cobalt iodide.

References Cited

FOREIGN PATENTS

| | | |
|---|---|---|
| 665,208 | 6/1963 | Canada. |
| 669,058 | 8/1963 | Canada. |
| 718,987 | 9/1965 | Canada. |
| 905,001 | 9/1962 | Great Britain. |

JOSEPH L. SCHOFER, Primary Examiner

R. A. GAITHER, Assistant Examiner

U.S. Cl. X.R.

260—93.7